US008407733B2

(12) United States Patent
Bradley (10) Patent No.: US 8,407,733 B2
(45) Date of Patent: Mar. 26, 2013

(54) METHOD AND APPARATUS FOR ESTABLISHING INDIVIDUALIZED SUBSCRIPTION PLANS IN A SWITCHED DIGITAL VIDEO SYSTEM

(75) Inventor: Bruce R. Bradley, Wayne, PA (US)

(73) Assignee: General Instrument Corporation, Horsham, PA (US)

( * ) Notice: Subject to any disclaimer, the term of this patent is extended or adjusted under 35 U.S.C. 154(b) by 400 days.

(21) Appl. No.: 12/339,303

(22) Filed: Dec. 19, 2008

(65) Prior Publication Data

US 2010/0162321 A1  Jun. 24, 2010

(51) Int. Cl.
H04N 5/445 (2011.01)
H04N 7/173 (2011.01)

(52) U.S. Cl. ............... 725/27; 725/56; 725/86; 725/93; 725/98

(58) Field of Classification Search .................... 725/56, 725/127

See application file for complete search history.

(56) References Cited

U.S. PATENT DOCUMENTS

| 5,826,270 | A | 10/1998 | Rutkowski et al. |
|---|---|---|---|
| 5,969,748 | A | 10/1999 | Casement et al. |
| 6,662,365 | B1 | 12/2003 | Sullivan et al. |
| 6,675,384 | B1 | 1/2004 | Block et al. |
| 6,785,901 | B1 | 8/2004 | Horiwitz et al. |
| 6,922,843 | B1 | 7/2005 | Herrington et al. |
| 7,194,757 | B1 | 3/2007 | Fish et al. |
| 7,260,823 | B2 | 8/2007 | Schlack et al. |
| 2002/0023262 | A1 | 2/2002 | Porter |
| 2003/0046100 | A1 | 3/2003 | Yamauchi |
| 2003/0097563 | A1 | 5/2003 | Moroney et al. |
| 2004/0221303 | A1 | 11/2004 | Sie et al. |
| 2005/0028191 | A1 | 2/2005 | Sullivan et al. |
| 2005/0155052 | A1 | 7/2005 | Ostrowska et al. |
| 2005/0157217 | A1 | 7/2005 | Hendricks |
| 2005/0289623 | A1 * | 12/2005 | Midani et al. ............... 725/100 |
| 2006/0095940 | A1 | 5/2006 | Yearwood |
| 2006/0242683 | A1 | 10/2006 | Medford et al. |
| 2007/0107024 | A1 | 5/2007 | Versteeg et al. |
| 2007/0130596 | A1 | 6/2007 | Wirick |
| 2007/0186231 | A1 | 8/2007 | Haeuser et al. |
| 2009/0165072 | A1 * | 6/2009 | Wright-Riley ............... 725/127 |

FOREIGN PATENT DOCUMENTS

EP         0756797       10/2001

OTHER PUBLICATIONS

PC Magazine Staff, "FCC's Martin Supports 'A La Carte' Cable Plans", PCMAG.com, accessed at http://www.pcmag.com/article2/0, 1759,2174261,00.asp on Jul. 30, 2008.
Solis, Hilda L., "TV a la Carte? I'll take the Buffet", published May 15, 2007 by the San Francisco Chronicle, accessed through the Common Dreams News Center at http://www.commondreams.org/archive/2007/05/15/1210/print/ on Jul. 30, 2008.
Canadian Office Action for Canadian Patent Application No. 2,685,233, dated Aug. 7, 2012.

* cited by examiner

Primary Examiner — Kieu Oanh T Bui
(74) Attorney, Agent, or Firm — Lori Anne D. Swanson (57) ABSTRACT

A content delivery system headend is provided which includes a Switched Digital Video (SDV) manager for coordinating SDV sessions requested by subscribers over an access network. The headend also includes an input for receiving content to be broadcast during the SDV sessions and a subscriber control unit. The subscriber control unit is configured to compare channel change requests received by the SDV manager from subscribers to a current subscription plan that specifies a pre-established set of channels to which the subscriber has previously subscribed. In this way tuning information for accessing channels specified in the channel change requests is only supplied if the channel change requests request channels included in the current subscription plan.

21 Claims, 5 Drawing Sheets

METHOD AND APPARATUS FOR ESTABLISHING INDIVIDUALIZED SUBSCRIPTION PLANS IN A SWITCHED DIGITAL VIDEO SYSTEM

RELATED APPLICATION

This application is related to U.S. application Ser. No. 11/943,301, filed Nov. 20, 2007 and entitled "Method and Apparatus for Limiting Access to Programming in a Switched Digital Video System."

FIELD OF THE INVENTION

The present invention relates generally to content delivery systems that deliver broadcast channels and switched digital video (SDV) channels to subscribers and more particularly to techniques for implementing ala carte pricing that allows subscribers to customize their subscription plans by picking and choosing individual channels to include in their plans.

BACKGROUND OF THE INVENTION

The popularity of cable television has grown rapidly over the past two decades. This popularity has been driven in part by the improved reception quality offered by cable systems and by the increased variety of programming available to consumers.

The cable television industry has traditionally marketed and sold its programs to consumers in bulk, such as continuous feed broadcast and long-term subscriptions to movie channels. For instance, cable television may be sold as a basic package of channels, which may then be augmented by additional channels or sub-packages of channels, e.g., premium packages containing one or more additional channels. The television industry generally does not sell its programming on a unit per unit basis, such as the ordering of one channel. That is, consumers are generally not able to pick and choose which cable channels they want and incur charges on a per channel basis, a feature which is often referred to as ala carte pricing. Thus, consumers are forced to subscribe to packages that may include one hundred or more channels, only a few of which may be of interest to individual consumers.

Consumers, however, may in some cases prefer ala carte pricing because it may reduce costs and allow consumers to be more selective in their viewing.

SUMMARY OF THE INVENTION

In accordance with one aspect of the invention, a content delivery system headend is provided which includes a Switched Digital Video (SDV) manager for coordinating SDV sessions requested by subscribers over an access network. The headend also includes an input for receiving content to be broadcast during the SDV sessions and a subscriber control unit. The subscriber control unit is configured to compare channel change requests received by the SDV manager from subscribers to a current subscription plan that specifies a pre-established set of channels to which the subscriber has previously subscribed. In this way tuning information for accessing channels specified in the channel change requests is only supplied if the channel change requests request channels included in the current subscription plan.

In accordance with another aspect of the invention, a method is provided for delivering programming over a content delivery system. The method includes receiving over an access network a channel change request from a subscriber to supply a channel available from an SDV system. Tuning information for accessing the channel is supplied to the subscriber only if the channel is included in a subscription plan associated with the subscriber.

In accordance with yet another aspect of the invention, a method is provided for accessing channels over an SDV system. In response to user input, a channel change request is sent over an access network requesting the SDV system to supply a selected channel. A control message is received over the access network in response to the channel change request. The control message includes tuning information for tuning to a channel different from the selected channel if the user has not previously subscribed to the selected channel. The method also includes tuning to the different channel as directed by the control message.

DETAILED DESCRIPTION

As detailed below, ala carte pricing can be implemented in a relatively simple manner in Switched Digital Video (SDV) systems. SDV refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers or consumers. Also, unlike video on-demand, which switches a singlecast interactive program to a user, switched digital video switches broadcast streams, making each stream available to one or more subscribers or consumers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on-demand services.

SDV systems can simplify implementation of ala carte pricing because each time a user changes from one channel to another, a channel change request is sent from the user's subscriber device (e.g., a set top terminal) to a session manager in the network's headend. Channel change requests are one type of message that is communicated between the session manager and the subscriber using an SDV Channel Change Message (CCM) protocol, which can be implemented as a proprietary protocol or as an open standard. After a channel change request is passed from the subscriber to the session manager, the session manager would normally respond by sending a message that requests the subscriber device to tune to a channel on which the SDV channel will be made available. The message also includes the necessary tuning information for tuning to that SDV channel. In the present case the messages may direct the subscriber device to tune to an alternative channel, typically a channel that presents a message to the subscriber that the desired channel is unavailable under his or her current pricing plan. That is, the correct tuning information for the desired channel will be sent from the session manager to the subscriber device only if the channel change request is requesting a channel to which the customer has previously subscribed.

Figure 1:
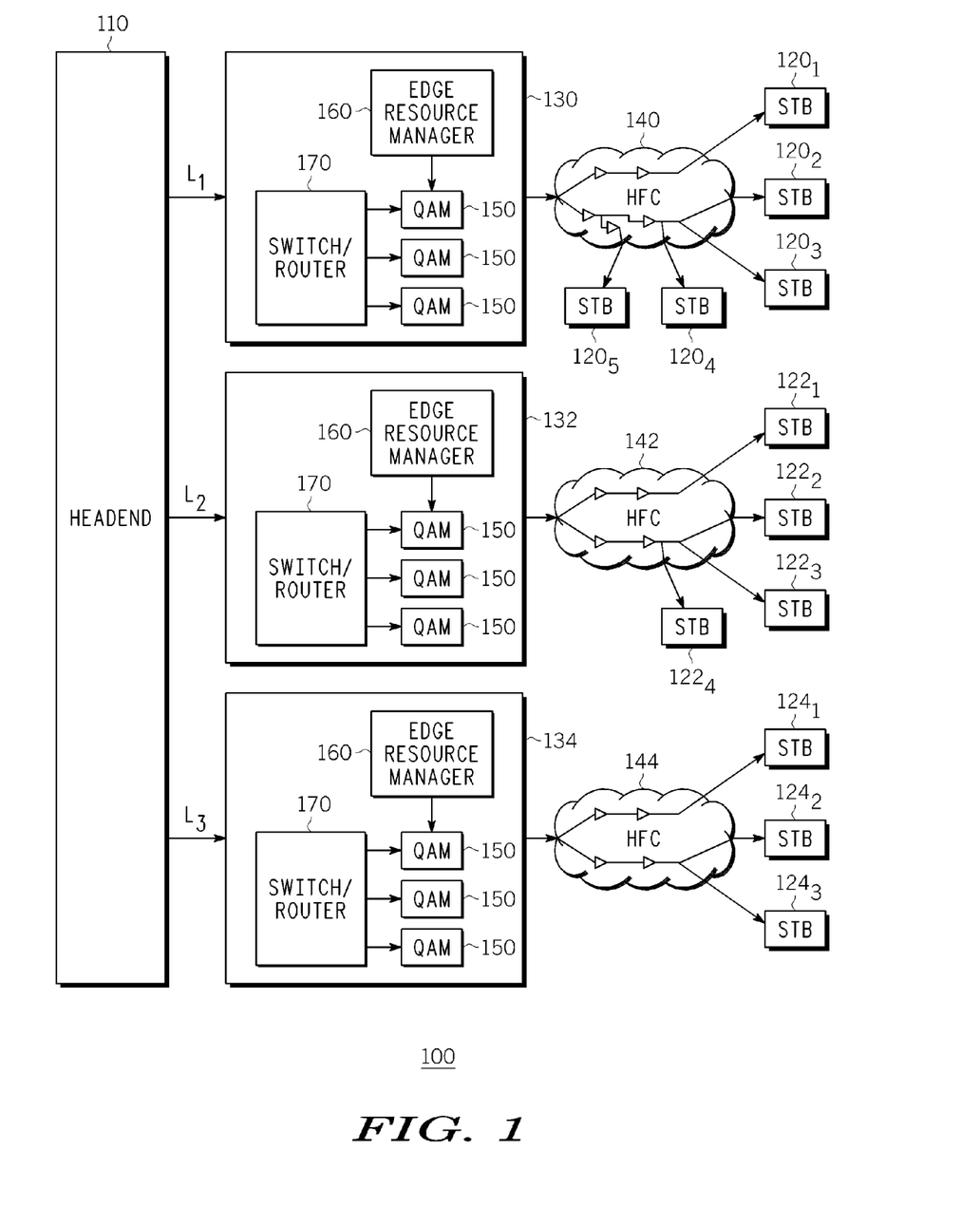
FIG. 1 shows one example of a content delivery system.

FIG. 1 shows one example of a content delivery system architecture 100 for delivering both broadcast channels and switched digital channels to a subscriber during a switched digital video (SDV) session. The SDV session is implemented through a service offering in which application level data generated by a set-top terminal initiates a SDV session request and an SDV manager routes data in accordance with the request to provision the service. Among other components, system architecture 100 comprises a content distribution source such as a headend 110 that is connected to multiple intermediate entities such as hubs 130, 132 and 134. The headend 110 communicates with a switch or router 170 in hubs 130, 132 and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicates with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set top terminals $120_1$, $120_2$, $120_3$, $120_4$ and $120_5$, access network 142 communicates with set top terminals $122_1$, $122_2$, $122_3$ and $124_4$, and access network 144 communicates with set top terminals $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. For instance, as previously noted, the number of edge devices needed to implement SDV channels is generally much greater than the number of edge devices needed to implement broadcast channels. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Each hub 130, 132 and 134 also includes an edge resource manager 160 for allocating and managing the resources of the edge devices 150. The edge resource manager 160 communicates with and receives instructions from the session manager located in the headend 110. In some cases the edge resource manager and/or session manager can be located in the headend.

Figure 2:
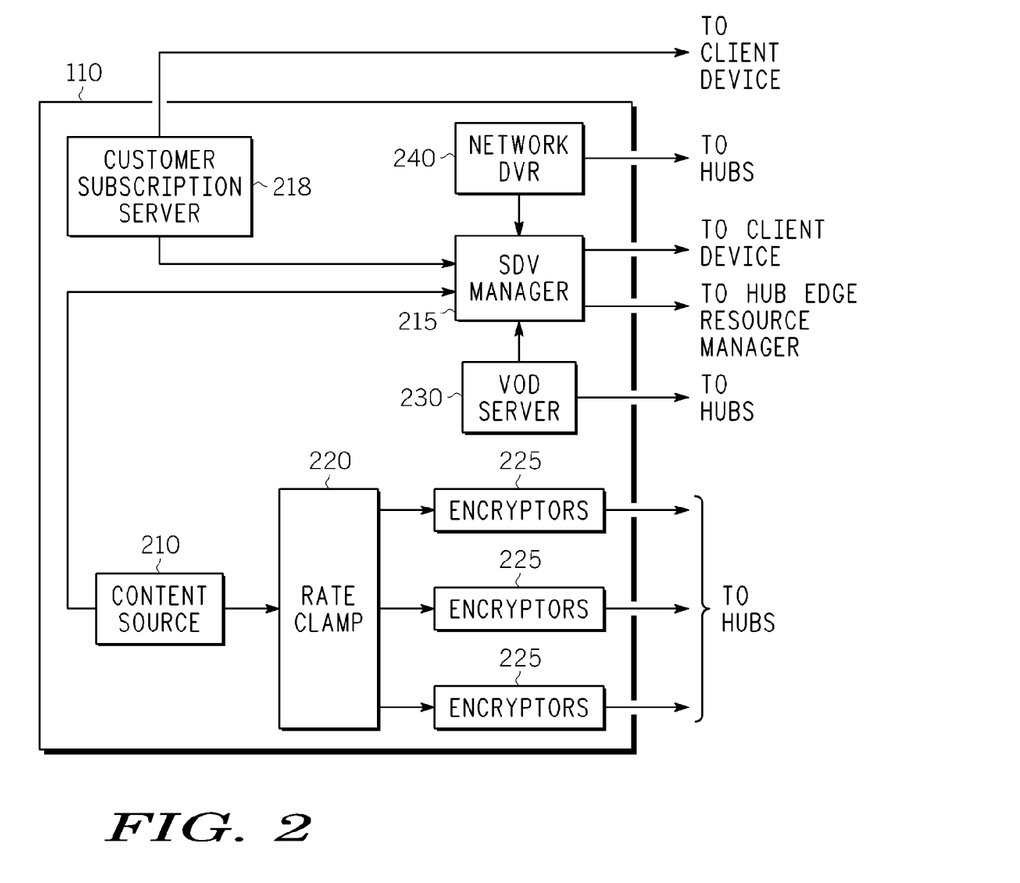
FIG. 2 shows one example of the headend depicted in FIG. 1.

FIG. 2 shows one example of headend 110. The headend 110 includes a broadcast content source 210, which may include, by way of example, satellite receivers, off-air receivers and/or content storage devices such as servers. A SDV manager 215 is used to determine which SDV transport streams are being transmitted at any time and for directing the set top terminals to the appropriate stream. The SDV manager 215 also keeps track of which subscribers are watching which channels and it communicates with the edge resource managers 160 in the hubs so that the content can be switched on and off under the control of the SDV manager 215. In addition, all subscriber requests for a switched digital channel go through the SDV manager 215. The switched digital channels are forwarded to a rate clamp 220 and one or more encryptors 225 using, for example, IP multicast addressing. The content is then encrypted by the encryptors 225 and transmitted to the appropriate hub or hubs. Typically, standard definition (SD) channels are currently rate clamped to 3.75 Mbps while high definition channels are currently rate clamped to between about 12 Mbps and 15 Mbps. The encryptors 225 encrypt the digitally encoded content, often under the control of a conditional access system (not shown).

Headend 110 may also include a network DVR 240. The network DVR 240 stores content that can be transmitted to set top terminal via a hub and access network in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

Headend 110 may also include a variety of other components for offering additional services. For example, in FIG. 2 a video on demand (VOD) server 230 is shown for storing programs or other content for distribution to subscribers on an on-demand basis. Although not shown, one of ordinary skill in the art would recognize that other components and arrangements for achieving the various functionalities of headend 110 are possible. For example, the headend 110 may comprise typical headend components and services including a billing module, an advertising insertion module, a subscriber management system (SMS), a conditional access system and a LAN(s) for placing the various components in data communication with one another. Headend 110 also includes a customer subscription server 218, which will be discussed below. It will also be appreciated that the headend configuration depicted in FIG. 2 is a high-level, conceptual architecture and that each network may have multiple head-ends deployed using different architectures.

It should be noted that in some cases the functionality of some or all of the headend components shown in FIG. 2 may be transferred in whole or in part to each of the hubs 130, 132 and 134. For example, Channel Change Messages may be communicated between the set top terminals and the hubs instead of between the set top terminals and the headend. In addition, some or all of the functionality of the SDV manager 215 and/or the customer subscription server 218 may be distributed among other components such as an SDV operations manager (SDVOM), which is sometimes used to configure and monitor SDV systems.

The edge devices 150 provide programming to the set top terminals using the downstream in-band channels. To communicate control information and the like with the headend 110 and/or the relevant hub, the set top terminals may use out-of-band (OOB) or DOCSIS channels or an IP tunnel or an IP connection and associated protocols. However, in some cases communication of control information and the like can be performed using in-band channels as well.

Control information that may be communicated over the out-of-band channels includes the aforementioned SDV channel change messages (CCM), which are used to pass channel change requests from the subscriber to the SDV manager 215 in the headend 110. In particular, the SDV manager 215 receives channel change requests for switched digital content from a set top terminal to bind that content to a session on one of edge devices 150 serving that set top terminal's service group. The channel change request message is generated by the SDV application (or its designated proxy) resident in the set top terminal in response to the subscriber's program channel request that is entered by the set top terminal's user interface. The SDV manager 215 responds to the set top terminal with the frequency and program number where that content may be found. The SDV manager 215 requests the set top terminal to tune to the channel corresponding to this frequency and program number. The SDV manager 215 also receives channel change request messages for non-SDV (e.g., broadcast) channels in order to gather statistics that can be used to better understand subscriber activity and to provide information that can be used for targeted advertising and the like. Another reason to receive non-SDV channel changes is so that the SDV Manager knows when the set top terminals are no longer tuned to an SDV channel, thus allowing the SDV Manager to remove the SDV channel from the network to save bandwidth.

As previously mentioned, since the SDV manager 215 receives channel change requests for SDV and non-SDV channels, the SDV manager can be configured so that the necessary tuning information is only passed along to the subscriber in an in-band or out-of-band control message if the channel change request is requesting a channel to which the customer has previously subscribed. If the request is not for a channel to which the consumer has subscribed, the control message from the SDV manager will direct the subscriber to tune to an alternative channel, typically a channel that presents a message to the subscriber that the desired channel is unavailable because the consumer has not purchased access to it. The message may also provide instructions to the consumer concerning how to receive the channel in the future. It should be noted that the message will generally be delivered in the form of an MPEG-2 encoded still frame that is maintained at the headend so that it can be used whenever necessary. The set top terminal will tune to still frame when it is directed to do so. In some cases it may be necessary to prevent the set top terminal from acquiring the tuning information for the blocked channel from an alternative source such as the active services list that is often transmitted using the mini-carousel protocol (MCP). This can be accomplished by sending a control message to the set top terminal instructing it to only tune to channels provided through the SDV manager.

The consumer's subscription preferences may be communicated to the SDV manager 215 in any appropriate manner. For instance, in one example, the user may supply the preferences via an Internet-enabled client device that accesses a user account database in a server associated with or in communication with the SDV manager 215, such as customer subscription server 218 depicted in FIG. 2. The client device may be the user's own set top terminal or another device such as a personal computer, PDA, networked appliance, cellphone or the like. The user account database in the server 218 may be accessed through an application-level interface residing on the client device such as a web-browser.

Figure 3:
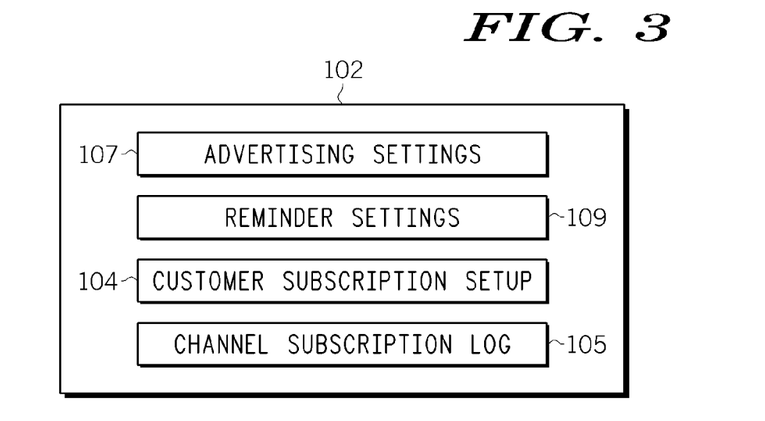
FIG. 3 shows one example of a setup menu that may be displayed to the user when contacting the headend.
Figure 5:
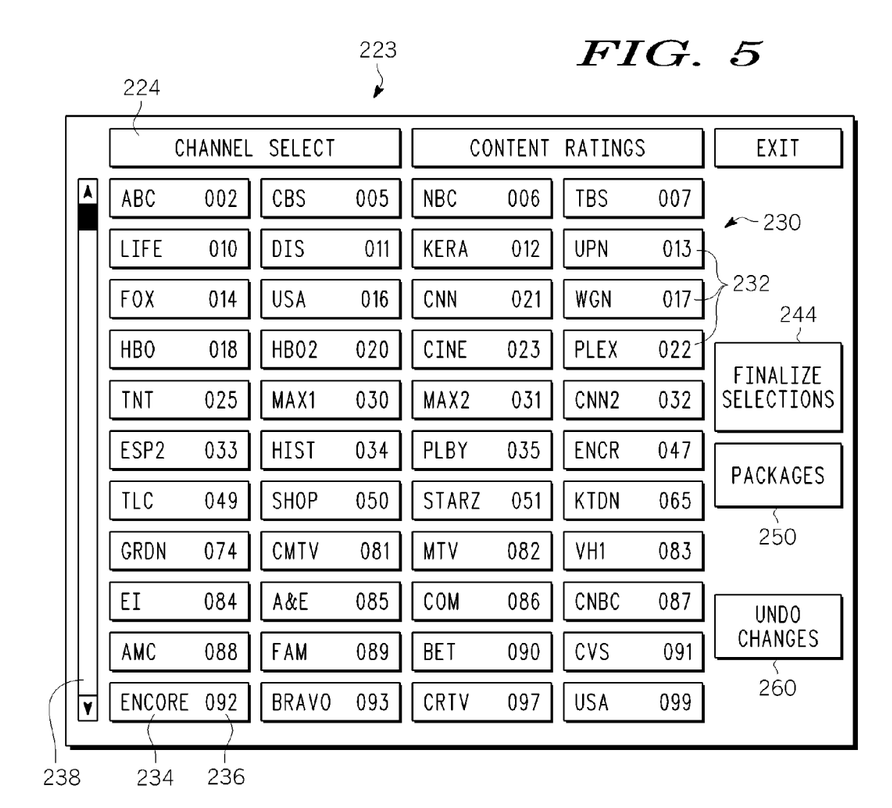
FIG. 5 shows a channel subscription screen that may be presented to user after making a selection from the setup option in FIG. 3 or a selection from the screen FIG. 4.
Figure 6:
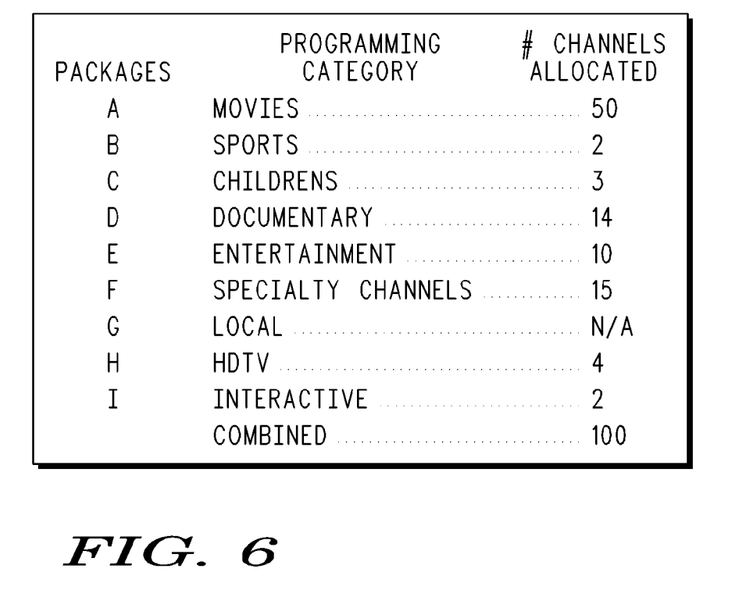
FIG. 6 shows a channel subscription screen that allows the user to select from among a variety of different subscription packages each containing a theme-based set of channels.

FIG. 3 shows one example of a setup menu 102 that may be displayed to the user when contacting the headend 110. The menu presents various settings options such as an advertising setting 107, reminder setting 109, customer subscription setup menu 104 as well as channel subscription log 105. The customer subscription feature may be accessed by selecting the customer subscription setup menu 104 so that a subscription preference interface is displayed, examples of which are shown in FIGS. 5-6. In some cases an input dialog box will first appear requiring a password to be input prior to accessing the parental lock interface. In other cases a password may not be required until an attempt is made to alter the control settings. FIG. 3 also shows a channel subscription log 105 that allows the subscriber to see a list of all the channels to which the subscriber currently subscribes.

Figure 4:
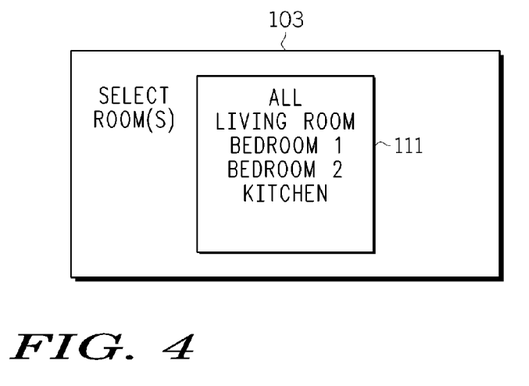
FIG. 4 shows a customer subscription screen that may be presented to the user if the user has more than one set top terminal in his or residence.

The customer subscription screen 103 of FIG. 4 may be presented to the user if the user has more than one set top terminal in his or residence and if the service provider offers subscriptions that distinguish between channels that are available on a single set top terminal or multiple set top terminals in the same residence. For instance, the service provider may charge an incrementally greater fee for each additional set top terminal in a single residence on which a channel is to be viewed. The screen 103 provides the user with a pulldown menu 111 that presents the user with the option to establish a common package of channels for all the set top terminals or to establish different packages of available channels on a room by room basis.

Once the desired selection has been made from the customer subscription screen 103, the channel selection screen 223 shown in FIG. 5 may be presented. The screen 223 presents a channel select button 224, which is highlighted (or otherwise made visually distinguishable) in FIG. 5 to indicate that it is the selected screen. The channel subscription screen 223 includes a field 230 of channel cells 232. In each channel cell there is a channel identifying field 234 and a channel number field 236. The channel identifying field contains channel identifying indicia such as one or more of the channel number, channel call letters, channel name, and the like. In other examples, the channel logo may be depicted in the channel identifying field, for example, as each channel cell's sole channel identifying indicium, or, in addition to one or more of channel number, channel call letters, channel name, and so forth. In the channel selection screen 223, a user may select particular channels to which to subscribe, for example, wherein clicking on a particular channel cell toggles that channel between a subscribed and unsubscribed state. The indicia within the cells of subscribed channels generally will be distinguishable from unsubscribed channels. In the event that the number of channels available is greater than the number of channel cells 232 that may be displayed within the interface screen 223, a scroll bar 238 may be provided to allow a user to bring additional channels into view in field 230. A button 244 is provided to activate the selections after a user's selections have been made using the channels cells 232. Actuation of the button 244 may take the customer to one or more additional screens that may used to perform billing and other administrative tasks that may be necessary before the ala carte subscription process is complete. A user's previous settings may be saved in memory and an undo button 260 may be provided that allows a user to discard any channel selections made and to reinstate earlier selections. If a password was not required to access the channel selection interface itself, a dialog box requiring entry of a password may be provided when the user selects buttons 244 or 260.

With some cable systems offering upwards of 300 or more channels, customers may sometimes find the number of individual channels from which to choose bewildering. To assist customers in selecting channels of interest the service provider may offer packages of programs for a variety of programming categories that may be desirable to subscribers. For example, selection of packages button 250 brings up the menu of packages shown in FIG. 6. In this example a variety of package categories are offered, including movies, sports, children's, documentary, and so on. One advantage to providing program packages using an SDV arrangement is that the service provider may be able to conveniently offer a greater variety of packages than the 2 or 3 tiers of subscription levels that are typically offered by service providers.

In the examples described above either channel cells (FIG. 5) or package cells (FIG. 6) may be selected directly from the interface by a user. In other examples, however, a more interactive interface and method for obtaining input from a user may be employed. For instance, some users may prefer an interface which is even simpler and more automated. In this case a human oriented set of questions may be provided that asks the individuals about the types of programming in which they are interested. In some cases the questions can be posed in an interactive or wizard format wherein a series of questions are asked and wherein the answers to the questions dictate the subsequent questions. For example, such a questionnaire or wizard interface might begin by asking if any of the users of the SDV system are children. If all of the users are adults, the program might then avoid recommending any child-oriented channels. On the other hand, if the user indicates that a child or children will be viewing programming, the wizard may then query as to the children's ages. After the children's ages are entered by the user, the wizard may then recommend certain channels appropriate for those ages.

Some users may prefer to make their channel selections in an even simpler and more interactive manner than can be accomplished using the preceding interactive wizard interface. For these users the service provider may provide telephone support in which an operator obtains the input from the user and enters it on his or her behalf. In this way the user never even needs to directly input any information through a set top terminal, PC or other client device.

In operation, the SDV system will provision the customer's channel selections each and every time the SDV manager 215 in FIG. 2 receives a channel change request by accessing the customer subscription server 218. This can be accomplished by comparing the content of the channel change request to the customer's selected channels located in the customer's account in the database associated with server 218. If the channel request matches one of the previously selected channels, the request to supply the SDV program will be fulfilled. That is, the SDV manager 215 will provide the customer with the necessary tuning information for the SDV program. If, on the other hand, the channel request does not match one of the previously selected channels, the request to supply the SDV program will be denied. That is, the SDV manager 215 will not provide the subscriber with the necessary tuning information for the SDV program if such a match is not found. Rather, a message will direct the subscriber device to tune to an alternative channel, typically a channel that presents a message to the subscriber that the desired channel is one that has not been purchased by the customer.

The message that is sent when the subscriber device is forced to tune to an alternative channel may also inform the customer as to how the desired SDV program or channel may be acquired. Even if the customer had originally communicated his or her subscription preferences over a personal computer or telephone, the message would ideally instruct the customer how to subscribe to the channel using his or her set top terminal. In this way the customer can subscribe to the channel in real time with minimal delay. For example, if the subscriber is attempting to tune to a program such as a sporting event or news show that is to be delivered in real-time, the subscriber can quickly subscribe to the channel without missing much or any of the program.

Figure 7:
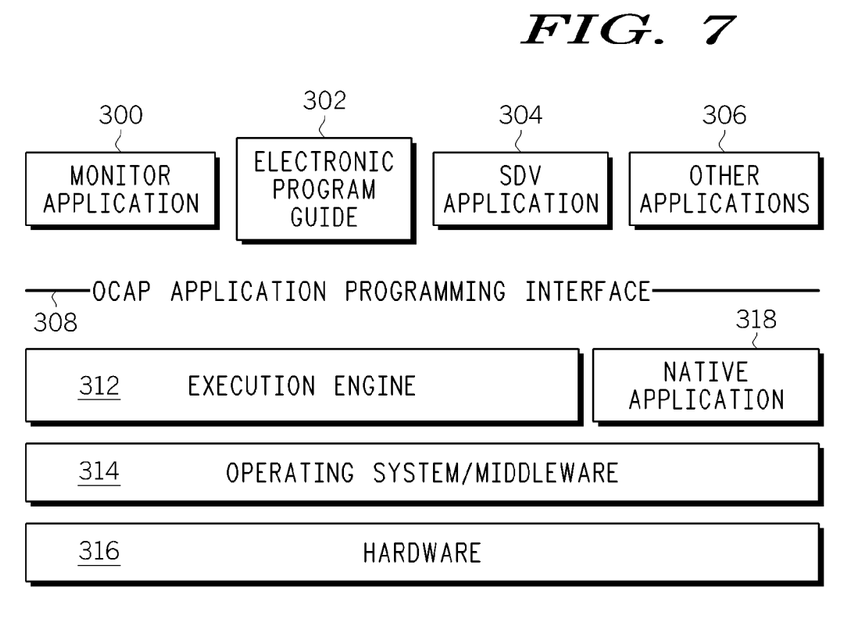
FIG. 7 shows the logical architecture of one particular example of a set top terminal such as those depicted in FIG. 1.

FIG. 7 shows the logical architecture of one particular example of a set top terminal such as those depicted in FIG. 1. In this example the set-top terminal is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set top terminal is not limited to an OCAP-compliant software/hardware architecture. In other cases, for example, the set top terminal may be compliant with MHEG, DASE or Multimedia Home Platform (MHP) middleware. Alternatively, the set top terminal may be based on a proprietary architecture.

Referring to FIG. 7, the top of an OCAP software "stack" includes a Monitor Application 300, Electronic Program Guide (EPG) 302, SDV application 304, and any other applications 306 that may be deployed in a particular network. These applications are run on top of a software layer called the "Execution Engine" 312 and interface to the Execution Engine using the well known OCAP APIs 308. The client device may also include certain software applications or "Native Applications" 318 that do not run within the Execution Engine, but directly run on top of the Operating System/Middleware 314 for the client device. Native Applications are typically written for, e.g., a particular hardware configuration 316 of the set top terminal. Examples of such Native Applications may include management of front panel functionality, remote control interaction, games, and the like. The objects downloaded to the client device in accordance with the techniques described herein may include any of the aforementioned applications and programs as well as additional applications, programs or other objects. However, during an upgrade many of the objects that need to be downloaded may be directed to applications located above the OCAP application programming interface 308.

When acquiring viewership information in accordance with the techniques described herein, the SDV application 304 is loaded onto the set top terminals. Once installed, the set top terminals can be readily configured to generate and transmit to the SDV manager the channel change requests, even if all the channels in the system are in a broadcast configuration.

Figure 8:
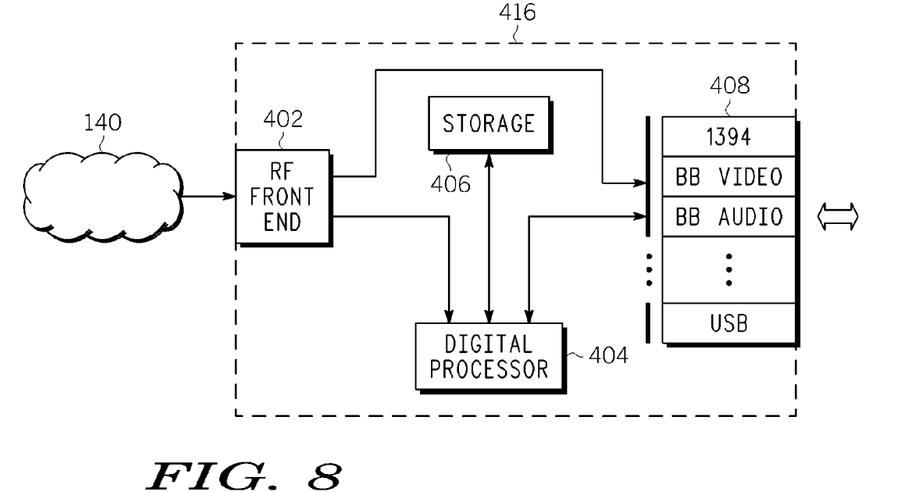
FIG. 8 shows one example of the set top terminal hardware.

FIG. 8 shows one example of the set top terminal hardware 416. The device hardware 416 generally includes an RF front end 402 (including a modulator/demodulator and a tuner or tuners) for interfacing with the distribution network (e.g., HFC network 140) of FIG. 1, digital processor(s) 404, storage device 406, and a plurality of interfaces 408 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the device include one or more decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

As noted, the SDV application 304 is responsible for communicating the channel change information (e.g., SDV CCMs) between the set top terminal and the SDV manager. The SDV application 304 also receives from the SDV manager the control messages that request the set top terminal to tune to a particular channel or program corresponding to the tuning information provided in the control message.

The EPG 302 displays information analogous to TV listings found in local newspapers or other print media. An EPG provides information about each program being broadcast within the time period covered by the EPG, which typically ranges from the next hour up to several days. The information contained in an EPG includes programming characteristics such as, for example, channel number, program title, start time, end time, elapsed time, time remaining, a brief description of the program's content and possibly the names of individuals associated with the program such as the actors, writers and director. The EPG, which is generally received along with the programming content, may be updated on a periodic basis so that the consumer can make appropriate selection for upcoming programs. For example, the electronic program guide 302 may display programs in a tabular format by channel and time so that the user can make selections of desired content. In some cases, instead of transmitting it along with the programming, the electronic program guide 302 may be downloaded via a telephone line, cable connection, satellite up-link, down-link, or radio broadcast antenna. In some cases EPG 302 may be customized for each subscriber so that it only displays those channels to which the subscriber is currently subscribed. This can be accomplished in a variety of different ways. For instance, the headend may use the information in customer subscription server 218 to ensure that the EPG information delivered to the set top terminal is limited to the subscriber's channels. Alternatively, the headend may deliver all the available information to the set top terminal, which may filter the information before presenting it to the subscriber so that it is limited to the subscriber's channels.

Figure 9:
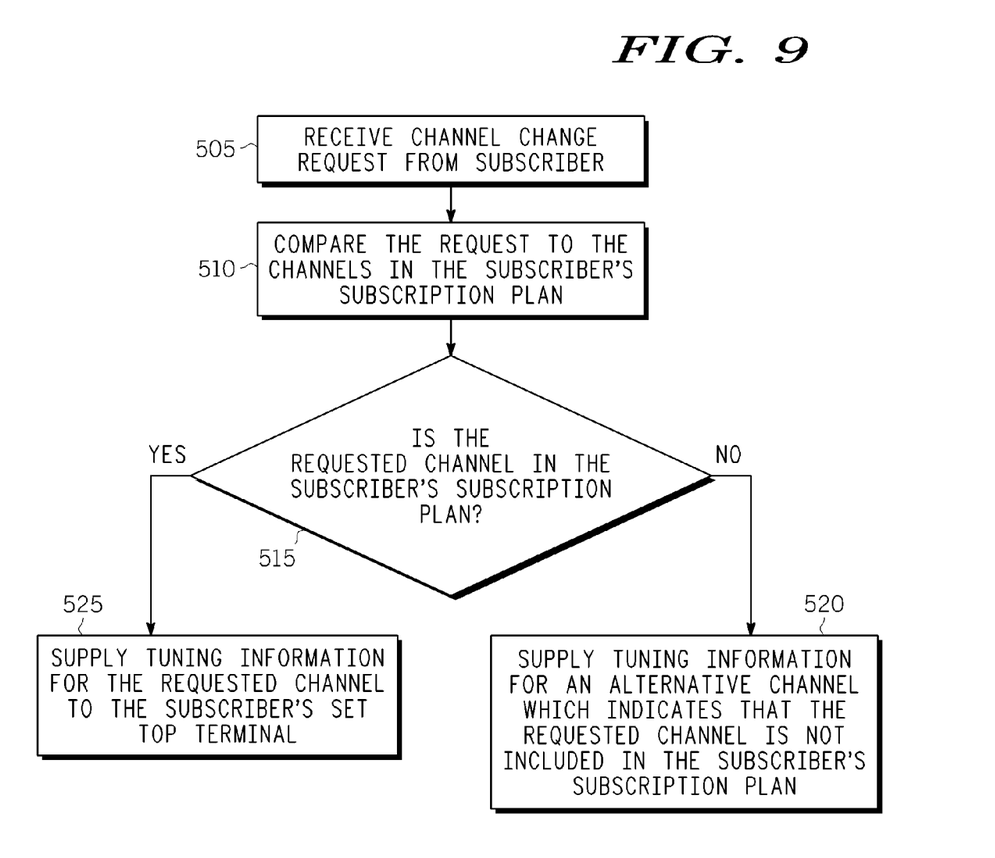
FIG. 9 is a flowchart showing one example of a method by which an SDV system ensures that only channels in the subscriber's subscription plan are provided to the subscriber.

FIG. 9 is a flowchart showing one example of a method by which an SDV system ensures that only channels in the subscriber's subscription plan are provided to the subscriber. The method begins in step 505 when the SDV manager or other suitable entity in the SDV system receives a channel change request for a particular channel or program from the subscriber. Next, in step 510, the SDV system compares the request to the channels in the subscriber's subscription plan, which includes the set of channels to which the subscriber has previously subscribed. At decision step 515, the SDV manager determines if the requested channel is included in the subscriber's subscription plan. If so, then at step 525 the SDV system supplies the tuning information for the requested channel to the subscriber's set top terminal so that the subscriber may view the requested channel. If not, then at step 520 the SDV system supplies tuning information for an alternative channel that indicates that the requested channel is not included in the subscriber's subscription plan.

The processes described above, including but not limited to those presented in connection with FIG. 9, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for allowing SDV system subscribers to conveniently pick and choose individual channels to which they wish to subscribe. This ala carte selection of channels is implemented by the SDV manager or other appropriate entity by forcing the set top terminal or other subscriber end device to tune to an alternative channel if the user attempts to tune to a channel not included among the individual channels to which the user has subscribed. That is, the SDV manager will only send the necessary tuning information to the subscriber end device if the user requests a channel to which he or she has previously subscribed.

The invention claimed is:

1. A content delivery system, comprising:
a Switched Digital Video (SDV) manager for coordinating SDV sessions requested by subscribers over an access network;
an input for receiving content to be broadcast during the SDV sessions; and
a subscriber control unit for comparing channel change requests received by the SDV manager from a subscriber to a current subscription plan associated with the subscriber that specifies a pre-established set of channels to which the subscriber has previously chosen such that tuning information for accessing channels specified in the channel change requests is only supplied if the channel change requests request channels included in the current subscription plan,
wherein the pre-established set of channels specified by the current subscription plan comprises individual broadcast streams available to a plurality of subscribers by joining a broadcast stream selected by the subscriber from a plurality of available channels comprising broadcast streams available to the plurality of subscribers.

2. The content delivery system of claim 1 wherein the SDV manager is further configured to transmit a control message to a first subscriber requesting a first channel to tune to an alternative channel instead of the first channel if the first channel is not included in the pre-established set of channels, wherein the alternative channel presents a message to the first subscriber indicating that the channel requested by the first subscriber is not included in the first subscriber's current subscription plan.

3. The content delivery system of claim 1 wherein the channels include non-SDV channels.

4. At least one computer-readable medium encoded with instructions which, when executed by a processor, performs a method including:
   receiving over an access network a channel change request from a first subscriber to supply a channel available from an SDV system;
   comparing the requested channel to a current subscription plan specifying a set of channels to which the first subscriber has previously subscribed;
   fulfilling the request to supply the requested channel to the first subscriber only if the current subscription plan for the first subscriber includes the requested channel,
   wherein the set of channels specified by the current subscription plan individual broadcast streams available to a plurality of subscribers by joining a broadcast stream selected by the first subscriber from a plurality of available channels comprising broadcast streams available to the plurality of subscribers.

5. The computer-readable medium of claim 4 wherein fulfilling the request comprises transmitting a control message to the first subscriber over the access network, wherein the control message includes tuning information for accessing the requested channel.

6. The computer-readable medium of claim 4 wherein, if the requested channel does not match one of the channels in the set of channels, denying the request by transmitting a control message to the first subscriber requesting the first subscriber to tune to an alternative channel instead of the channel requested by the first subscriber.

7. The computer-readable medium of claim 6 wherein the alternative channel presents a message to the first subscriber indicating that the channel is not included in the set of channels to which the subscriber is currently subscribed.

8. The computer-readable medium of claim 7 wherein the message includes instructions specifying how the subscriber may purchase access to the requested channel.

9. The computer-readable medium of claim 4 wherein the requested channels is an SDV channel.

10. The computer-readable medium of claim 4 wherein the requested channel is a non-SDV channel.

11. The computer-readable medium of claim 4 wherein the channel change request is transmitted in a Channel Change Message that conforms to a switched digital video Channel Change Message protocol.

12. The computer-readable medium of claim 4 further comprising:
   receiving a message from a subscriber over the access network specifying at least one additional channel to which the subscriber wishes to subscribe; and
   adding the additional channel to an entry for the subscriber in a subscriber database that stores the subscriber's current subscription plan.

13. The computer-readable medium of claim 4 further comprising providing electronic program guide information to the subscriber over the access network only for the set of channels specified in the current subscription plan.

14. A method for providing programming over a content delivery system, comprising:
   receiving over an access network a channel change request from a subscriber to supply a channel available from an SDV system; and
   supplying tuning information for accessing the channel to the subscriber only if the channel is included in a subscription plan associated with the subscriber,
   wherein the subscription plan comprises individual broadcast streams available to a plurality of subscribers by joining a broadcast stream selected by the subscriber from a plurality of available channels comprising broadcast streams available to the plurality of subscribers.

15. The method of claim 14 further comprising transmitting a control message to the subscriber requesting the subscriber to tune to an alternative channel instead of the channel requested by the subscriber if the channel requested by the subscriber is not included in the subscription plan.

16. The method of claim 15 wherein the alternative channel presents a message to the subscriber indicating that the channel requested by the subscriber is not included in the subscriber's subscription plan and informing the subscriber as to how to subscribe to the requested channel.

17. The method of claim 14 wherein the channel is a non-SDV channel.

18. A method for accessing channels over an SDV system, comprising:
   in response to user input, sending a channel change request over an access network requesting the SDV system to supply a selected channel;
   receiving over the access network a control message in response to the channel change request, said control message including tuning information for tuning to a channel different from the selected channel if the user has not previously subscribed to the selected channel in a current subscription plan; and
   tuning to the different channel as directed by the control message,
   wherein the current subscription plan is a subscription plan comprising individual broadcast streams available to a plurality of subscribers by joining a broadcast stream selected by the user from a plurality of available channels comprising broadcast streams available to the plurality of subscribers.

19. The method of claim 18 further comprising identifying to the SDV system at least one channel to which the user is including in a current subscription plan associated with the user.

20. The method of claim 19 wherein the identification of the at least one channel is provided over an Internet connection using a web-based interface.

21. The method of claim 19 wherein identifying the at least one channel to the SDV system includes selecting at least one package of channels to which to subscribe, the package including a set of channels made available by the SDV system.

* * * * *